Jan. 30, 1968    R. L. WILSON ET AL    3,366,911
ELECTRICAL CONTROL WITH PANEL MOUNTING MEANS
Filed Dec. 10, 1963    3 Sheets-Sheet 1

INVENTORS
ROBERT L. WILSON
WILBERT H. BUDD
JOHN D. VAN BENTHUYSEN
BY John J. Gaydos
ATTORNEY INVENTORS
ROBERT L. WILSON
WILBERT H. BUDD
JOHN D. VAN BENTHUYSEN
BY John J. Gaydos
ATTORNEY INVENTORS
ROBERT L. WILSON
WILBERT H. BUDD
JOHN D. VAN BENTHUYSEN
BY John J. Gaydos
ATTORNEY

United States Patent Office 3,366,911
Patented Jan. 30, 1968

3,366,911
ELECTRICAL CONTROL WITH PANEL MOUNTING MEANS
Robert L. Wilson, Wilbert H. Budd, and John D. Van Benthuysen, Elkhart, Ind., assignors to CTS Corporation, Elkhart, Ind., a corporation of Indiana
Filed Dec. 10, 1963, Ser. No. 329,469
18 Claims. (Cl. 338—197)

The present invention relates to electrical components and, more particularly, to an electrical control with an electrically nonconductive anti-wobble fastener for mounting or securing the electrical control to a panel or wall of a chassis.

One of the difficulties in mounting an electrical control, e.g., a variable resistor, with rapid mounting means to a panel is overcoming the wobble between the control and the panel. Many different types of electrical controls with fasteners for reducing or eliminating wobble are available on the market today. One of these type fasteners is generally referred to as a plug-in fastener, a specific example thereof being disclosed and claimed in Daily et al., Patent No. 2,874,254, issued Feb. 17, 1959, entitled, Variable Resistor With a Plug-In Mounting and assigned to the same assignee as the present invention. The Daily et al. plug-in fastener of stamped metal and provided with a plurality of spring fingers for engaging the rear face of the panel mounts an electrical control to a panel and limits the amount of rocking or wobble of the control when the shaft is rotated. Such plug-in fasteners for variable resistors and other electrical controls have been satisfactory for certain applications where a small amount of wobble is not objectionable and, accordingly, have reduced the time required for securing electrical controls to a panel of a radio or a television set. There still is, however, a great demand for a wobbleless fastener for rapidly mounting and rigidly securing an electrical control to a panel. It would, therefore, be desirable to provide an anti-wobble fastener for rapidly mounting and rigidly securing an electrical control to a panel.

In the past when it was desired to insulate electrically an electrical control in a high voltage circuit from an electrically conductible panel, it was necessary to employ insulating sleeves and washers for properly spacing the fastening means of the control from the panel. Even when prior plug-in mountings such as disclosed in the above Daily et al. patent or other mountings such as shown in the patents to Arisman et al., No. 2,721,245; Bush et al., No. 2,616,642; and Budd, No. 2,616,643 are employed, other insulating means is still necessary for spacing the electrical control from the panel. For example, a panel of electrically nonconductive material, e.g., of laminated plastic, is secured to the chassis of a television set or the like wherever it is intended to mount and insulate electrically an electrical control with plug-in fastener from the electrically conductible portion of the chassis. It would, therefore, be desirable to provide an electrical control, e.g., a variable resistor, with a unitary electrically nonconductive fastener for rapidly mounting the control to a panel or the like and for electrically insulating the control from the panel.

Accordingly, it is an object of the present invention to provide a new and improved electrical control with anti-wobble fastener.

Another object of the present invention is to provide an electrical control with an electrically nonconductive fastener for mounting the control to a panel.

An additional object of the present invention is to provide an electrical control with an electrically nonconductive fastener mountable to a panel, the fastener having a pair of peripherally disposed legs adapted to be flexed radially of the axis of the shaft of the control when being mounted in the panel.

A further object of the present invention is to provide an electrically nonconductive snapping-in fastener securable to a panel in a simple and facile manner.

Still another object of the present invention is to provide an apertured panel with cam surfaces for receiving an electrical control with electrically nonconductive fastener.

Still an additional object of the present invention is to provide a fastener having a pair of legs securable to a panel wherein the base portion of each of the legs has a lower rate of deflection than the upper portion of each of the legs.

A still further object of the present invention is to provide an electrical control with electrically nonconductive twist-locking fastener for securing the control to a panel.

Yet another object of the present invention is to provide an electrically nonconductive anti-wobble fastener having an extended bearing for rotatably supporting a shaft projecting outwardly from the control.

Yet a further object of the present invention is to provide a fastener having a pair of uncinate members, each member being provided with a neck portion and a camming surface engageable with the front surface of the panel for eliminating wobble of an electrical control mounted thereto.

Further objects and advantages of the present invention will become apparent as the following description proceeds, and the features of novelty which characterize the invention will be pointed out with particularity in the claims annexed to and forming a part of this specification.

Briefly, the present invention relates to an electrical control with a fastener comprising a mounting plate and a pair of legs projecting from the plate for securing a control to a panel, both the plate and the legs being integral and of electrically nonconductive material. For the purpose of rigidly securing the control to the panel, the neck of the uncinate member or upper portion of each of the legs of the fastener has a cross section smaller than the cross section of the base portion of each of the legs to assure that the uncinate members will have a greater rate of deflection than the base portions of the legs radially of the movable member of the control when the fastener is being mounted to the panel. It is essential that such relationships as to the rate of deflection exist in the fastener between the uncinate members and the base portions of the legs regardless of whether the fastener is of the twist-locking or snapping-in type. In a preferred form, an extended bearing is integrally secured to the mounting plate.

For a better understanding of the present invention, reference may be had to the accompanying drawings wherein the same reference numerals have been applied to like parts and wherein.

Referring now to FIGURES 1 through 6 of the drawings, there is illustrated an electrical component of the type employed in electrical apparatus such as radio and television sets, generally indicated at 11, comprising a variable resistor or electrical control 12 and an electrically nonconductive fastener 13 of a resilient material, e.g., hard rubber, nylon, Bakelite or polychlorotrifluoroethylene, for mounting the variable resistor to a panel 14. It is to be understood, however, that the present invention is not to be restricted to a variable resistor with fastener and can include other electrical controls such as a switch, an overload circuit breaker or the like with fastener.

Figures 1, 2, 3:
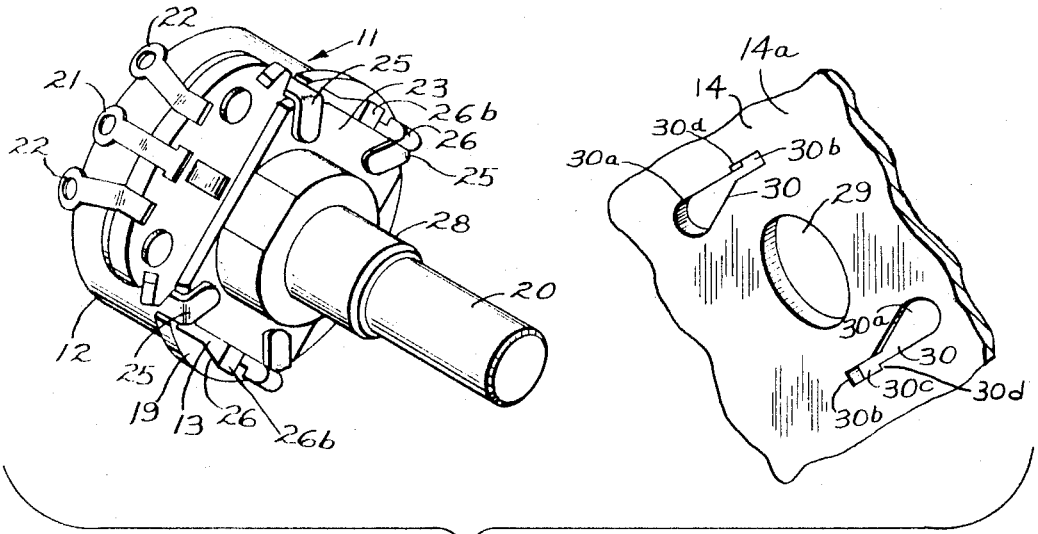
FIGURE 1 is an isometric view of an improved electrical component comprising an electrical control and an electrically nonconductive fastener mountable to an apertured panel in accord with the present invention.
FIGURE 2 is a partially sectionalized side elevational view of the electrical component of FIGURE 1 showing the structural details of the control.
FIGURE 3 is a front view of the electrically nonconductive fastener shown in FIGURE 1.

Considering first the variable resistor 12 as best shown in FIGURE 2 of the drawings, it comprises a cover 15 enclosing a rotor 16 carrying a contact 17 and an arcuate resistance element 18 mounted on the inner side of a terminal plate 19. A shaft 20 projecting outwardly from the terminal plate 19 has its inner end secured to the rotor 16. Upon rotation of the shaft, the contact 17 carried by the rotor 16 wipes the resistance element intermediate the ends thereof thus altering the electrical resistance between the center terminal 21 and the outer terminals 22.

As will become apparent from the following description, the fastener 13 comprises several electrically nonconductive elements integrally combined preferably for electrically insulating the control from a metal panel as well as for improving the operation of the electrical control 12 and the mounting thereof to the panel 14. In electrical controls, means are generally provided for mounting the cover 15 and for aligning the terminal plate 19 with respect to the panel 14. To this end, the fastener 13 is provided with a mounting plate 23 (see FIGURES 1, 3 and 4) having a flat rear surface 23a abutting against the terminal plate 19 and with a pair of locating pins 24 projecting outwardly of the flat rear surface 23a disposed in a pair of not shown openings in the terminal plate 19 for aligning the terminal plate to the fastener 13. The cover 15 is secured to the mounting plate 23 of the fastener 13 by ears or tabs 25 extending forwardly of the cover 15 and folded over the mounting plate 23 of the fastener 13, the terminal plate 19 being intermediate the fastener 13 and the cover 15 and, accordingly, fixedly sandwiched therebetween.

Figures 5, 6:
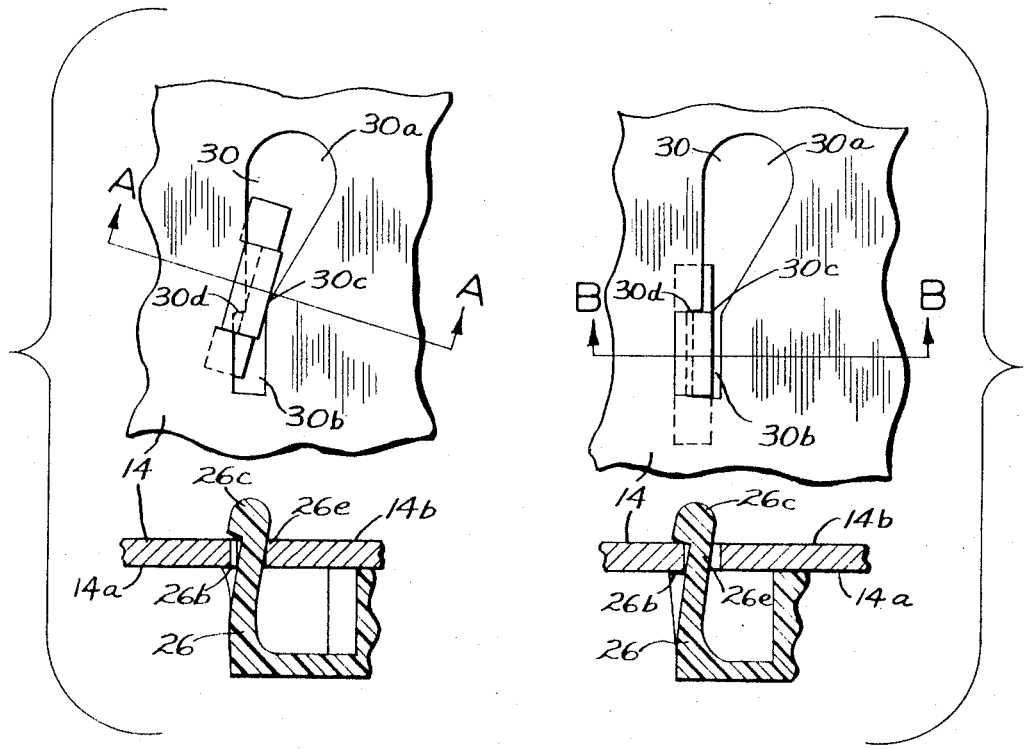
FIGURE 5 is a fragmentary front view of the fastener partially mounted in the panel and a fragmentary sectional view taken along lines A—A of the front view.
FIGURE 6 is similar to FIGURE 5 except that the fastener is in assembled position.
Figure 4:
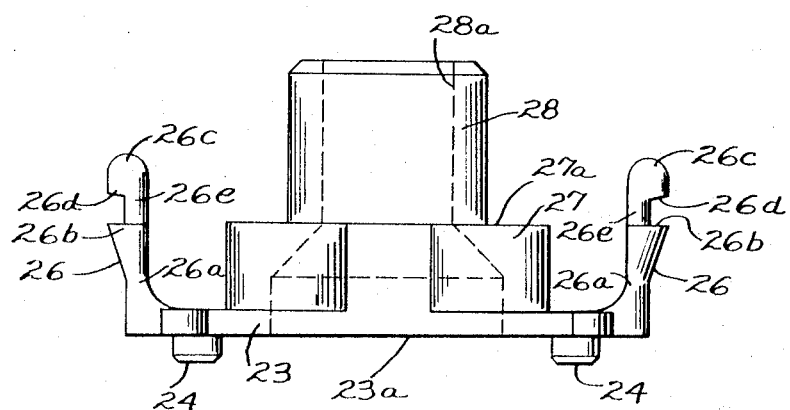
FIGURE 4 is a side elevational view of the fastener shown in FIGURE 3.
Figure 7:
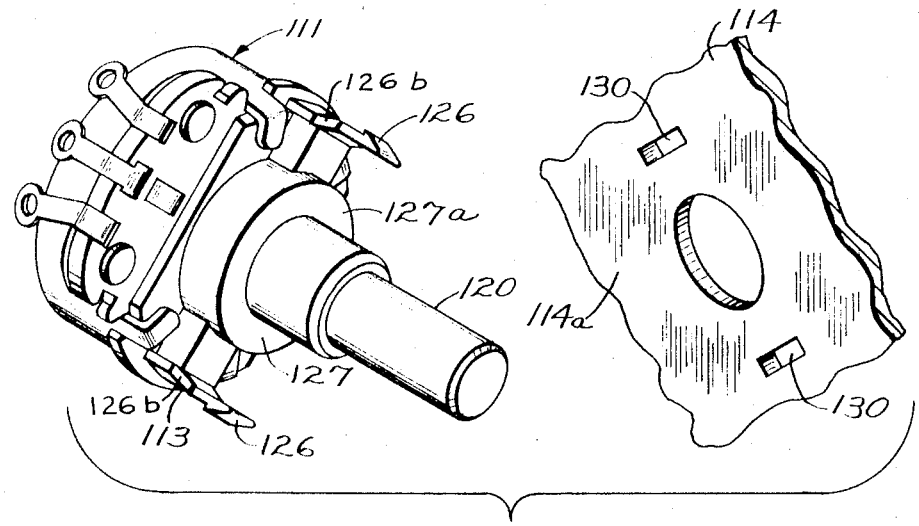
FIGURE 7 is an isometric view of another embodiment of an electrical component of the present invention wherein a snapping-in fastener is employed for mounting the control to the panel with a push action.
Figure 8:
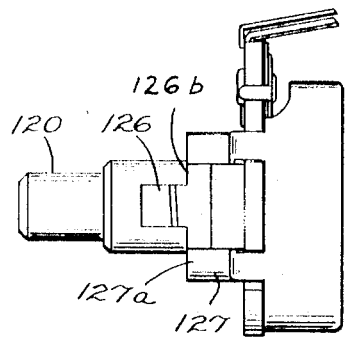
FIGURE 8 is a side elevational view of the electrical component shown in FIGURE 7.
Figure 9:
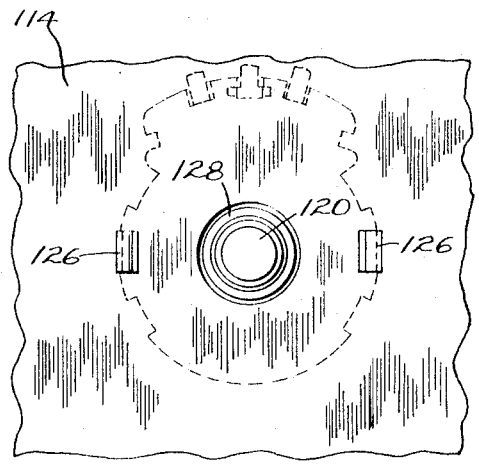
FIGURE 9 is a front view of the control of FIGURE 7 mounted in a panel.

For the purpose of fastening the electrical component 11 to the panel 14, a pair of diametrically and peripherally disposed legs 26 (see FIGURES 1, 2, and 4) extend forwardly of the mounting plate 23 at opposite ends thereof and in the present embodiment are an integral part thereof. Each leg 26 is provided with a base portion 26a and projecting therefrom is a pair of spaced supporting pads 26b abuttable against the rear surface 14a of the panel 14, the distance between the ends of the supporting pads and the mounting plate 23 determining the spacing between the panel and the electrical control. An upstanding latch or uncinate member 26c disposed intermediate the supporting pads 26b is engageable with the front surface 14b of the panel 14 and a neck 26e preferably slightly shorter than the thickness of the panel connects the uncinate member 26c to the leg. As best shown in FIGURES 4, 5, and 6 of the drawings in a preferred form of the invention, the engaging or camming surface 26d of each of the uncinate members 26c is inclined several degrees with respect to a plane in spaced parallel relationship to the major plane of the mounting plate 23 so as to force the supporting pads 26b of the fastener 13 firmly against the rear surface 14a of the panel 14 when engaged by the panel. It is, however, not necessary that the camming surface of the uncinate member be disposed at an angle to the mounting plate or the panel when the fastener is in the unflexed position since the legs of the fastener may be flexed before mounting until the desired angle is obtained.

An essential feature of the present invention is that the neck 26e have a cross section less than any portion between the top surface of the supporting pads 26b and the mounting plate 23 in order to assure that when the fastener 13 is being mounted to the panel 14 the uncinate members will flex at a greater rate than the supporting pads thereby increasing the distance between the outer edge of the engaging or camming surface 26d and the outer flat surface of the supporting pads 26b to permit rigid mounting of the fastener to a panel having a thickness substantially the same or slightly greater than the height of the neck. In other words, a compound flexure occurs to each of the legs and each of the legs functions as a double hinge, the first hinge being at the junction between the leg and the mounting plate and the second hinge being at the neck 26e when the fastener is being mounted. Since the cross section at the first hinge is greater than the cross section at the second hinge, the distance between the camming surface of the uncinate member and the flat surface of the supporting pad will increase when being mounted to the panel inasmuch as the rate of deflection thereof is greater than the rate of deflection of the base portion of the leg when the leg is deflected radially. With the above described arrangement, the electrically nonconductive fastener 13 may be adapted for mounting to panels of different thicknesses solely by controlling the width and angle of the engaging surface 26d and the spacing between the engaging surface 26d and the abuttable surfaces of the supporting pads.

Preferably, a washer or boss 27 projecting forwardly of the mounting plate 23 and, in the present embodiment an integral part thereof, is provided with a flat surface 27a abuttable against the rear surface 14b of the panel 14 and lies in the same plane as the abuttable or flat surface of each of the supporting pads 26b also for properly spacing the electrical control 12 from the panel 14. It is to be understood, however, that the uncinate members 26c and the boss 27 may be transposed in order that the uncinate members are in closer proximity to the shaft. According to the present invention, the fastener 13 is preferably provided with an extended bearing 28 of electrically nonconductive material projecting from the mounting plate 23 and, preferably an integral part thereof. The bearing 28, being of nonconductive material, not only rotatably supports the shaft 20 forwardly of the panel 14 but also insulates the shaft from the panel if the shaft 20 is of electrically conductive material. By providing the bearing substantially forward of the panel 14, rocking of the rotor 16 of the variable resistor 12 is reduced considerably when the shaft is rotated during operation of the control.

In one of the preferred forms of the invention, the panel 14 is provided with an opening 29 for receiving the shaft 20 and the extended bearing 28 of the fastener, the opening 29 being smaller than the boss 27 for limiting insertion of the fastener 13 into the panel 14, and with a pair of elongated apertures 30 for receiving, guiding, camming and flexing the uncinate members 26c of the fastener 13 when being mounted to the panel. Each of the apertures is provided with an enlarged portion 30a slightly larger than the uncinate member 26c and a reduced quadrilateral portion 30b, e.g., a rectangular portion, having a length substantially equal to the width of the neck 26e of the uncinate member and a width slightly greater than the thickness of the neck 26e. The enlarged portion 30a and the reduced portion 30b communicate with each other by means of a narrow channel 30c, the width of the channel being substantially equal to the width of the neck 26e (see FIGURE 5). For assuring that the electrically nonconductive fastener remains in proper alignment after being mounted to the panel 14, it is necessary that a stop means be provided to prevent inadvertent reverse rotation of the control in the panel. To this end, the rectangular portion 30b communicates with the enlarged portion 30a in such a manner so as to provide a stop 30d.

Referring now to FIGURES 5 and 6 of the drawings, as the uncinate members 26c of the fastener are initially inserted into the enlarged portions 30a of the panel 14, the flat surface 27a of the boss 27 and the flat surfaces of the supporting pads 26b abut against the rear surface 14a of the panel 14b. As the electrical component 11 is rotated with respect to the panel to lock the necks 26e of the uncinate members 26c in the reduced portions 30b of the apertures 30, a camming action flexes each leg 26 inwardly toward the axis of the shaft 20. More specifically, the leading edge of each of the necks 26e initially engages the outer side of the enlarged portion 30a causing the legs to be flexed inwardly toward each other. Since the cross section of the neck is less than the cross section of the base portion 26a of the associated leg 26, the rate of deflection of the uncinate member is greater than the base portion 26a thus increasing the angle of the camming surface 26d with respect to the front surface 14b of the panel. The neck 26e then enters the narrow channel 30c and passes through the channel until each of the members 26c is disposed in the rectangular portions 30b of the apertures 30. At this instant, the trailing edge of each of the necks 26e passes beyond the channel 30c and is urged outwardly to a position as shown in FIGURE 6 of the drawings. Since the camming surface 26d of each of the uncinate members 26c is disposed at a small angle with respect ot the front surface 14b of the panel, the outward radial movement of each of the legs froces the flat surfaces 27a of the boss 27 and the flat surfaces of the supporting pads 26b of the fastener against the panel 14. It should be appreciated that such anarrangement not only insulatedly mounts the electrical control firmly and rigidly against the rear surface of the panel but also firmly locks the control in the panel. Thus inadvertent reverse rotation of the control is prevented by the stop formed at each of the narrow channels 30c.

It is to be further understood that the legs 26 may be cammed inwardly or outwardly as the fastener is being mounted to the panel as long as there is flexing of the legs with respect to the mounting plate and the rate of deflection of the uncinate members is greater than the base portion of the legs. In a preferred form of the invention, the camming surface 26d of each of the uncinate members 26c is inclined in two planes (as best seen in FIGURE 2) to provide a greater distance at the leading edge of the neck 26e between the camming surface 26d and the flat surface of the adjacent supporting pad 26b than at the trailing edge of the neck between the camming surface 26d and the flat surface of the adjacent supporting pad 26b in order that the uncinate member 26c properly engages the front surface 14b of the panel 14 when slight variations in the thickness of the panel and/or the distance between the camming surface 26d and the flat surfaces of the supporting pads 26b occur as a result of normal manufacturing tolerances.

In an electrical control built in accord with the present invention, the fastener 13 has a dimension of .160 inch between the flat surface 27a of the bass 27 and the mounting plate 23. Since the thickness of the ears 25 of the cover 15 is approximately .018 inch, the distance between the rear surface 14a of the panel 14 and the closet electrically conductible portion of the control is approximately .142 inch, the space being sufficient to prevent arcing at least up to 10,000 volts in air.

In another embodiment of the invention as shown in FIGURES 7 through 10 of the drawings, an electrical control, generally indicated at 111, comprises an electrically nonconductive fastener 113, similar to the fastener 13 shown in FIGURES 1 through 6 of the drawings except that the fastener 113 is provided with a pair of snapping-in or push-in uncinate members 126 projecting forwardly from each of the legs insertable into a pair of openings 130 of the panel 114. Upon urgong the uncinate members 126 of the fastener into the openings 130, the legs are flexed toward each other until the other most edge of camming surface of each of the members 126 passes through the openings 130. At this instant, the legs flex radially outwardly forcing the flat surface 127a of the boss 127 and the supporting pads 126b against the rear surface 114a of the panel 114. It is to be understood that the fastener 113 although specifically designed for use as a snapping-in fastener may readily be employed as a twist-locking fastener merely by mounting the fastener to a panel 14 (see FIGURE 1) provided with apertures 30. Thus regardless of the type of application it is necessary that the uncinate members have a greater rate of deflection than the base portions of the legs.

Figure 10:
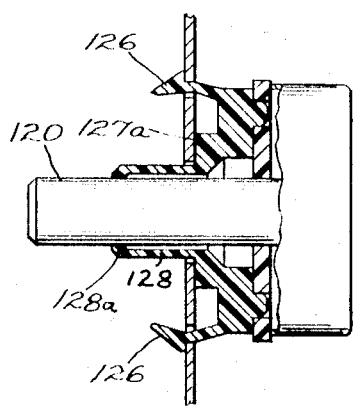
FIGURE 10 is a partially sectionalized side elevational view of the electrical component of FIGURE 7 mounted in a panel.

In a preferred form of the invention, and, as best shown in FIGURE 10 of the drawings, an extended bearing 128 projecting forwardly of the bass 127 and an integral part thereof is provided with a reduced inner diameter section 128a for assuring that a force applied normal to the outer end of the shaft 120 will have a minimum effect in rocking the rotor during rotation thereof.

It is to be understood that the term "uncinate member" denotes a member, e.g., a hook, latch, or barb, having an engaging or camming surface engaging a surface While there has been illustrated and described what is at present considered to be a preferred embodiment of the present invention and a single modification thereof, it will be appreciated that numerous changes and modifications are likely to occur to those skilled in the art, and it is intended in the appended claims to cover all those changes and modifications which fall within the true spirit and scope of the present invention.

The invention claimed is:

1. An electrical control having a shaft projecting forwardly therefrom and an electrically nonconductive fastener of resilient material for mounting the control to a panel to insulate electrically the control from the panel, the fastener comprising a mounting plate, a pair of peripherally disposed legs integrally secured to the mounting plate, a forwardly projecting boss integrally secured to the mounting plate abuttable against the rear surface of the panel for spacing the electrical control therefrom, the panel being provided with a central opening for receiving the shaft and with a pair of spaced apertures, each aperture being provided with an enlarged portion and with a reduced portion, a pair of spaced supporting pads having flat surfaces carried by each of the legs abuttable against the rear surface of the panel, and an uncinate member disposed intermediate each of the spaced supporting pads of each of the legs insertable into the enlarged portion of the aperture in the panel, each of the uncinate members being provided with a camming surface engageable with the front surface of the panel for urging the flat surfaces of the supporting pads and the boss against the rear surface of the panel and with a neck having a cross section smaller than the cross section of each of the legs so as to have a greater deflection rate than the legs whereby upon inserting the uncinate members in the enlarged portions of the apertures and rotating the fastener about its axis the uncinate members deflect radially in one direction at a greater rate than the legs thereby increasing the angle of the camming surfaces with respect to the front surface of the panel and the distance between the outer edge of the camming surface and the flat surfaces of the supporting pads to permit rigid mounting of the fastener to the panel when the uncinate members enter the reduced portions and are flexed in the opposite direction.

2. An electrical control having a shaft projecting forwardly therefrom and an electrically nonconductive fastener for mounting the control to a panel to insulate electrically the control from the panel, the fastener comprising a mounting plate, a pair of legs integrally secured to the outer periphery of the mounting plate, a pair of spaced supporting pads carried by each of the legs abuttable against the rear surface of the panel for spacing the electrical control from the panel, the panel being provided with a central opening for receiving the shaft and with a pair of spaced apertures on opposite sides of the opening, each aperture being provided with an enlarged portion and with a reduced portion, and an uncinate member disposed intermediate each of the spaced supporting pads of each of the legs insertable into the enlarged portion of the aperture in the panel and provided with a camming surface engageable with the front surface of the panel for urging the supporting pads against the rear surface of the panel, each of the uncinate members being provided with a neck portion integrally connected to the leg associated therewith, the neck portion having a cross section smaller than the cross section of each of the legs so that the uncinate members will have a greater deflection rate than the legs when inserted into the enlarged portions of the apertures of the panel and rotated about the axis of the fastener to position the necks of the uncinate members in the reduced portion of the apertures for firmly mounting the control to the panel.

3. A supporting panel provided with a central opening for receiving a shaft of a control and with a pair of spaced apertures on opposite sides of the central opening for receiving a pair of uncinate members carried by the control, said control having a plurality of supporting pads abutting against the rear surface of the panel, each of said spaced apertures being provided with an enlarged portion and with a reduced portion, each of the enlarged portions initially receiving the uncinate members and having an edge for guiding and radially flexing the uncinate members upon rotation of the uncinate members toward the reduced portions, the enlarged and reduced portions communicating with each other by means of a narrow channel, each of the uncinate members being provided with a neck connected to the control, the width of the channel being substantially equal to the width of the neck, said reduced portion being provided with a stop means for retaining the uncinate members in the reduced portions of the spaced apertures after the uncinate members are rotated into the reduced portions for firmly securing the control to the panel.

4. In combination with a supporting panel and an electrical control mountable onto the rear surface thereof, a fastener for mounting the electrical control to the rear surface of the supporting panel comprising a mounting plate fastenable to the electrical control, a pair of spaced legs integrally secured to opposite sides of the mounting plate, at least one supporting pad having a flat surface abuttable against the rear surface of the panel integral with each of the legs for spacing the electrical control from the panel, the panel being provided with a pair of spaced apertures, and an uncinate member carried by each of the legs insertable into the aperture of the panel for mounting the control thereto, each of the uncinate members being provided with a camming surface engageable with the front surface of the panel for urging the supporting pads against the rear surface of the panel and with a neck having a cross section smaller than the cross section of each of the legs so as to have a greater deflection rate than the legs whereby upon inserting the uncinate members into the apertures of the panel and rotating the fastener about its axis the uncinate members flex radially in one direction at a greater rate than the legs thereby increasing the angle of the camming surface with respect to the flat surface of the supporting pads mounted to the legs for receiving a portion of the panel therebetween and when the fastener is in final mounting position the uncinate members and the legs flex in the opposite direction causing the camming surfaces of the uncinate members to mount the fastener and the control fastened thereto securely to the panel.

5. In combination with a supporting panel and an electrical control mountable onto the rear surface thereof, a fastener for mounting the electrical control to the rear surface of the supporting panel comprising a mounting plate fastenable to the electrical control, a pair of legs integrally secured to the mounting plate having abutting surfaces abuttable against the rear surface of the panel for spacing the electrical control from the panel, the panel being provided with a pair of spaced apertures, and an uncinate member carried by each of the legs insertable into the aperture of the panel for mounting the control thereto, each of the uncinate members being provided with a camming surface engageable with the front surface of the panel and with a neck having a cross section smaller than the cross section of each of the legs so as to have a greater deflection rate than the legs whereby upon inserting the uncinate members into the apertures of the panel the uncinate members flex radially in one direction at a greater rate than the legs thereby increasing the angle between the camming surface and a plane defined by the abutting surfaces for engaging the front surface of the panel and when the fastener is in final mounting position the uncinate members and the legs flex in the opposite direction causing the camming surfaces of the uncinate members to mount the fastener and the control fastened thereto securely to the panel.

6. An electrical control having a shaft projecting forwardly therefrom and an electrically nonconductive fastener for mounting the control to a panel to insulate electrically the control from the panel, the fastener comprising a mounting plate, a pair of legs fixedly secured to the mounting plate at opposite ends thereof, a pair of spaced supporting pads carried by each of the legs abuttable again the rear surface of the panel, the panel being provided with an opening for receiving the shaft and with a pair of spaced apertures on opposite sides of the opening, each aperture being provided with an enlarged portion and with a quadrilateral portion, an uncinate member intermediate each of the spaced supporting pads of each of the legs insertable into the enlarged portion of the aperture in the panel, each of the uncinate members being provided with a camming surface lying in a plane forming an acute angle with the major plane of the mounting plate, and a neck portion connecting each of the uncinate members to the legs whereby upon inserting the uncinate members into the enlarged portions of the apertures of the panel and twisting the fastener about its axis until the uncinate members are disposed in the quadrilateral portions of the apertures the fastener insulatedly mounts the control to the panel.

7. An electrical control having a shaft projecting forwardly therefrom and an electrically nonconductive fastener of resilient material for mounting the control to an apertured panel to insulate electrically the control from the panel, said fastener comprising a mounting plate, a pair of flexible, electrically nonconductive legs peripherally secured to the mounting plate, at least one supporting pad integral with the mounting plate and adjacent to each of the legs and abuttable against the rear surface of the panel for insulatedly spacing the control from the panel, and an uncinate member carried by each of the legs having a camming surface engageable with the front surface of the panel only upon flexing of the uncinate member radially of the shaft for securing the control to the panel, the uncinate members being provided with a neck having a cross section smaller than the legs thereby having a greater rate of deflection than the legs to increase the angle between the camming surface of each of the uncinate members and a plane defined by the supporting pads upon securing the fastener to the panel.

8. An electrical control having a shaft projecting forwardly therefrom and an electrically nonconductive fastener of resilient material for mounting the control to an apertured panel to insulate electrically the control from the panel, said fastener comprising a mounting plate, a pair of flexible, electrically nonconductive legs peripherally secured to the mounting plate, at least one supporting pad integral with the mounting plate and adjacent each of the legs and abutable against the rear surface of the panel for insulatedly spacing the control from the panel, an extended bearing integrally connected to the mounting plate, the bearing being provided with a bore having a reduced inner diameter near the outer end thereof so as to form a journal for rotatably supporting the shaft anterior of the panel, and an uncinate member carried by each of the legs having a camming surface engageable with the front surface of the panel only upon flexing of the uncinate member radially of the shaft for securing the control to the panel, the uncinate members being provided with a neck having a cross section smaller than the legs thereby having a greater rate of deflection than the legs to increase the angle between the camming surface of each of the uncinate members and a plane defined by the supporting pads upon securing the fastener to the panel.

9. An electrical control having a shaft projecting forwardly therefrom and an electrically nonconductive fastener of resilient material for mounting the control to an apertured panel to insulate electrically the control from the panel, said fastener comprising a mounting plate, a pair of flexible, electrically nonconductive legs integrally secured to the mounting plate, at least one supporting pad integrally secured to the mounting plate and abutable against the rear surface of the panel for insulatedly spacing the control from the panel, and an uncinate member carried by each of the legs having a camming surface engageable with the front surface of the panel only upon flexing of the uncinate member radially of the shaft for securing the control to the panel, the uncinate members being provided with a neck having a cross section smaller than the legs thereby having a greater rate of deflection than the legs to increase the angle between the camming surface of each of the uncinate members and a plane defined by the supporting pads upon securing the fastener to the panel.

10. An electrical control having a shaft projecting forwardly therefrom and an electrically nonconductive fastener for mounting the control to a panel to insulate electrically the control from the panel, said fastener comprising a mounting plate, a pair of legs peripherally secured to the mounting plate at opposite sides thereof, a pair of spaced supporting pads carried by each of the legs abuttable against the rear surface of the panel, a boss projecting forwardly of the mounting plate and integrally secured thereto abuttable against the rear surface of the panel for spacing the control therefrom, the boss being provided with a centrally disposed opening supporting the shaft projecting forwardly of the control, the panel being provided with a central opening for receiving the shaft and with a pair of spaced apertures, each aperture being provided with an enlarged portion and with a quadrilateral portion, an uncinate member intermediate each of the spaced supporting pads of each of the legs insertable into the enlarged portion of the panel and rotatable toward the quadrilateral portion, the uncinate members being provided with a camming surface lying in a plane forming an acute angle with the major plane of the mounting plate, and a neck portion intermediate the supporting pads and the camming surface connecting each of the members to the legs.

11. An electrical control having a shaft projecting forwardly therefrom and an electrically nonconductive fastener of resilient material for mounting the control to a panel to insulate electrically the control from the panel, said fastener comprising a mounting plate, a pair of flexible legs secured to the mounting plate at opposite sides thereof, a pair of spaced supporting pads carried by each of the legs abuttable against the rear surface of the panel, an apertured boss projecting forwardly of the mounting plate and integrally secured thereto, the boss having a flat surface abuttable against the rear surface of the panel for spacing the control therefrom, an extended bearing integrally secured to the boss for supporting the shaft forwardly of the panel, the panel being provided with a central opening for receiving the extended bearing and the shaft and with a pair of spaced apertures, each aperture being provided with an enlarged portion and with a rectangular portion, an uncinate member disposed intermediate each of the spaced supporting pads of each of the legs insertable into the enlarged portion of the aperture in the panel, and a neck portion disposed intermediate the supporting pads and the engaging surface whereby upon inserting the uncinate members into the enlarged portions of the apertures of the panel and twisting the fastener about its axis until the neck portions are disposed in the rectangular portions of the apertures the fastener insulatedly mounts the control to the panel.

12. In an electrical control of the type wherein an operable shaft projects from the control, the combination of an electrically nonconductive mounting plate fastened to the body of the control, electrically nonconductive bearing means integral with the mounting plate supporting the operable shaft, a pair of diametrically disposed electrically nonconductive uncinate members projecting forwardly from the mounting plate and integrally secured thereto for mounting the control to a panel, and at least one supporting pad integrally secured to each of the uncinate members abuttable against the rear surface of the panel for spacing the electrically conductible portion of the control from the panel, the uncinate members being provided with means for engaging the front surface of the panel to urge the control toward the rear surface of the panel until the supporting pads abut against the rear surface of the panel.

13. In an electrical control of the type wherein an operable shaft projects from the control and a mounting plate is secured to the electrical control, the improvement comprising a pair of spaced, electrically nonconductive uncinate members of resilient material projecting forwardly of the mounting plate for securing the control to a panel, each of the uncinate members being adapted to be flexed radially of the shaft, electrically nonconductive bearing means integral with the mounting plate supporting the operable shaft, and an electrically nonconductive means integrally secured to the mounting plate adjacent to the uncinate members and abuttable against the rear surface of the panel for insulatedly spacing the electrically conductible portion of the control from the panel.

14. An electrical control having an operating shaft extending forwardly from the front thereof, in combination with an electrically nonconductive fastener fixedly secured to the control for securing the control to the rear of a panel, the operating shaft being accessible from the front of the panel, the fastener comprising a mounting plate fixedly secured to the front of the control, means integrally secured to the mounting plate for spacing the control from the rear surface of the panel, a pair of spaced legs extending forwardly from the mounting plate, a pair of spaced supporting pads integral with the mounting plate and adjacent to the legs for engaging the rear surface of the panel, and an uncinate member integrally secured to each of the legs and adapted to project forwardly through an aperture in the panel for insulatedly mounting the control to the panel whereby upon inserting the uncinate members of the fastener into the apertures and rotating the control the legs of the fastener are flexed radially until the uncinate members are rotated beyond a restricted portion of the apertures to lock the uncinate members and urge the means and the supporting pads against the rear surface of the panel to secure firmly and insulatedly the control to the panel.

15. An electrically nonconductive twist-locking fastening device for firmly securing an electrical control to an electrically conductible panel comprising a mounting plate fixedly securable to the electrical control, means projecting forwardly from the mounting plate for spacing the control from the panel, and extended bearing integrally secured to the mounting plate for rotatably supporting a shaft projecting forwardly from the electrical control, the bearing being receivable in an opening provided in the panel for insulating the shaft from the panel, a pair of flexible legs integrally secured to the mounting plate and receivable in apertures provided in the panel for mounting the control to the panel, a pair of supporting pads integral with the mounting plate for engaging the rear surface of the panel, and an uncinate member integral with each of the legs and projecting forwardly therefrom for engaging the front surface of the panel, each uncinate member being provided with a camming surface lying in a plane forming an acute angle with the major plane of the mounting plate for urging the means and the supporting pads of the fastener against the rear surface of the panel when the fastener is mounted to the panel.

16. An electrically nonconductive twist-locking fastening device of resilient material for firmly securing an electrical control to a panel comprising a mounting plate fixedly securable to the electrical control, means projecting forwardly from the mounting plate for spacing the control from the panel, and a pair of flexible legs integrally secured to the mounting plate and receivable in a pair of apertures provided in the panel for mounting the control to the panel, each of said legs comprising a pair of supporting pads for engaging the rear surface of the panel, and an uncinate member integral with each of the legs and projecting forwardly therefrom for engaging the front surface of the panel, each uncinate member being provided with a camming surface lying in a plane forming an acute angle with the major plane of the mounting plate for urging the means and the supporting pads of the fastener against the rear surface of the panel when the fastener is mounted to the panel.

17. In an electrical control mountable to a panel, the combination of a housing, an operable shaft extending outwardly of the housing, and an electrically nonconductive fastener fixedly secured to the housing, said fastener comprising a mounting plate, electrically nonconductive extended bearing means integral with the mounting plate supporting the operable shaft, a pair of flexible electrically nonconductive legs integral with the mounting plate, an uncinate member integral with each of the legs for engaging the front surface of the panel, and electrically nonconductive means integral with the mounting plate for engaging the rear surface of the panel to space the housing therefrom.

18. The electrical control of claim 17, wherein the last mentioned means extend forwardly of the mounting plate and are disposed above and below a plane passing through the longitudinal axis of the shaft and the uncinate members for minimizing wobble of the control after the control is mounted to a panel as the shaft is operated.

References Cited

UNITED STATES PATENTS

| 2,389,750 | 11/1945 | Turner et al. | 338—164 |
| 2,721,245 | 10/1955 | Arisman et al. | 339—128 X |
| 2,874,254 | 2/1959 | Daily et al. | 174—51 |
| 2,884,609 | 4/1959 | Fraser et al. | 339—126 X |
| 2,911,610 | 11/1959 | Kirk | 339—126 X |

FOREIGN PATENTS 789,746    1/1958    Great Britain.

LARMIE E. ASKIN, *Primary Examiner.*

W. B. FREDERICK, J. F. RUGGIERO,
*Assistant Examiners.*